United States Patent [19]
Aoki et al.

[11] Patent Number: 6,064,514
[45] Date of Patent: *May 16, 2000

[54] OPTICAL SURGE PREVENTING METHOD AND SYSTEM FOR USE WITH OR IN A RARE EARTH DOPED FIBER CIRCUIT

[75] Inventors: Yasuhiro Aoki; Takaaki Ogata; Kenichi Yoneyama; Yukio Michishita; Yoshiro Sato, all of Tokyo, Japan

[73] Assignee: NEC Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/740,413

[22] Filed: Oct. 29, 1996

[30] Foreign Application Priority Data

| Oct. 30, 1995 | [JP] | Japan | 7-281178 |
| Dec. 27, 1995 | [JP] | Japan | 7-341776 |
| Feb. 27, 1996 | [JP] | Japan | 8-39574 |
| May 31, 1996 | [JP] | Japan | 8-138474 |

[51] Int. Cl.$^7$ ........................................ H01S 3/00
[52] U.S. Cl. .................................... 359/341; 359/160
[58] Field of Search ................... 359/341, 160, 359/161

[56] References Cited

U.S. PATENT DOCUMENTS

| 5,088,095 | 2/1992 | Zirngibl . | |
| 5,566,018 | 10/1996 | Lee et al. | 359/341 |
| 5,589,975 | 12/1996 | Nakamura et al. | 359/345 |
| 5,598,491 | 1/1997 | Ohya et al. | 385/24 |
| 5,633,749 | 5/1997 | Shibuya | 359/341 |
| 5,680,246 | 10/1997 | Takahashi et al. | 359/341 |

FOREIGN PATENT DOCUMENTS

| 4-68830 | 3/1992 | Japan . |
| 4-340933 | 11/1992 | Japan . |
| 5-63653 | 3/1993 | Japan . |
| 5-206557 | 8/1993 | Japan . |
| 5-235810 | 9/1993 | Japan . |
| 6-21887 | 1/1994 | Japan . |
| 6-132895 | 5/1994 | Japan . |
| 6-204947 | 7/1994 | Japan . |
| 8-179388 | 7/1996 | Japan . |
| 9-18415 | 1/1997 | Japan . |
| 9-162475 | 6/1997 | Japan . |
| 9-186383 | 7/1997 | Japan . |
| 2 287 148 | 9/1995 | United Kingdom . |
| WO 95/22847 | 8/1995 | WIPO . |

OTHER PUBLICATIONS

Patent Abstracts of Japan, Publication No. 06152034 dated May 31, 1994.

Patent Abstracts of Japan, Publication No. 06216452 dated Aug. 5, 1994.

Shin–ichi Furukawa, et al., "Enhanced Coherent OTDR for Long Span Optical Transmission Lines Containing Optical Fiber Amplifiers", IEEE Photonics Technology Letters, vol. 7, No. 5, 1995, pp. 540–542.

*Primary Examiner*—Mark Hellner
*Attorney, Agent, or Firm*—Scully, Scott, Murphy & Presser

[57] ABSTRACT

Optical surge preventing systems and methods for rare earth-doped optical fiber amplifiers are disclosed. The systems are so arranged as to cause any signal existing in a doped fiber section so as not to over excite the rare earth elements in the doped fiber section. In one embodiment, a background signal light with such a wavelength as to cause induced emission in the doped fiber section is always coupled into the doped fiber section regardless of whether a message signal light exists or not. The background signal light may be generated by any suitable light source or a light spontaneously emitted from either end of the doped fiber section. In another embodiment, a dummy signal light is coupled into the doped fiber section if the level of the message signal light becomes less than a predetermined value. Coupling of the background signal light or the dummy signal light into the doped fiber section may be done from either of the message signal input and output sides.

54 Claims, 8 Drawing Sheets

OPTICAL SURGE PREVENTING METHOD AND SYSTEM FOR USE WITH OR IN A RARE EARTH DOPED FIBER CIRCUIT

BACKGROUND OF THE INVENTION

The present invention relates generally to a method and system for preventing any optical surges from occurring in a rare earth-doped fiber circuit such as an erbium-doped fiber amplifier (EDFA) etc.

There are known optical amplifiers comprising rare earth (e.g., erbium) element-doped optical fibers. In such an optical amplifier, rare earth elements in an optical amplifier medium or a rare earth-doped fiber section are excited by a pump light, and a signal light coming into the rare earth-doped fiber section causes induced emission by the excited rare earth element, providing amplification of the signal light. These kind of amplifiers are applied to optical booster amplifiers, optical pre-amplifiers, optical repeaters, etc. in an optical transmission system.

Figure 1A:
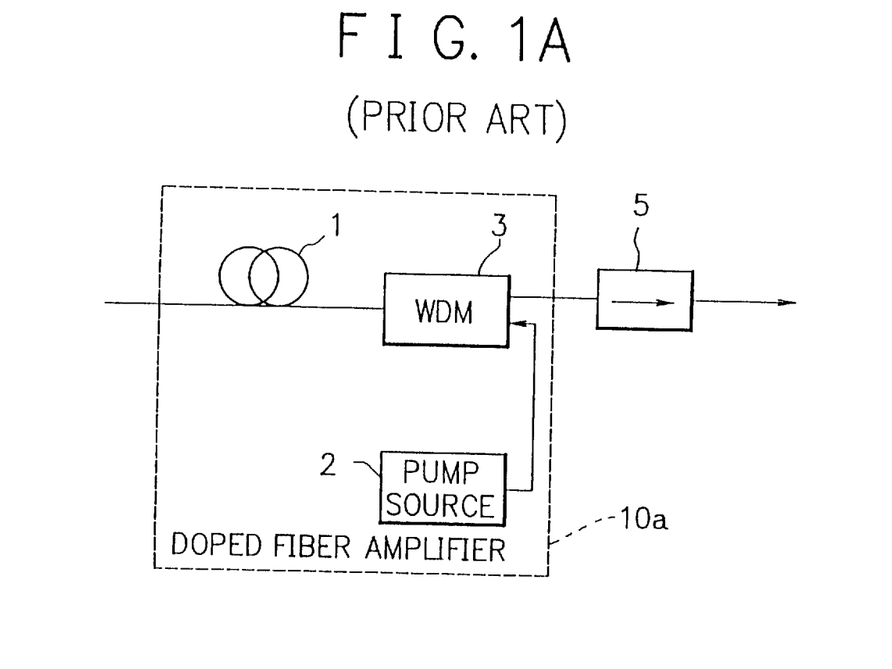
FIGS. 1A and 1B are block diagrams showing exemplary arrangements of conventional rare earth-doped fiber circuits.
Figure 1B:
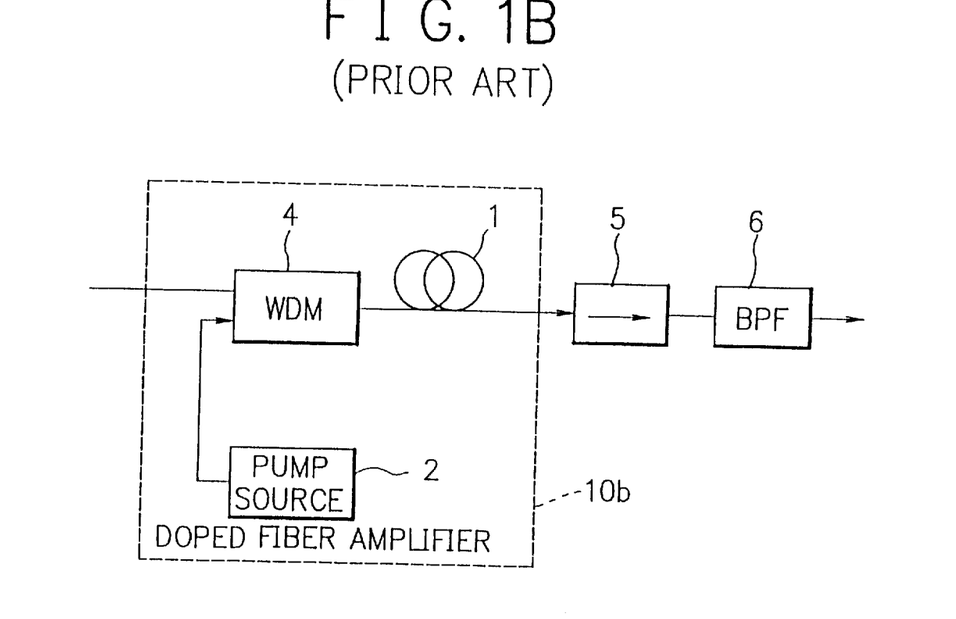

FIGS. 1A and 1B are diagrams showing exemplary arrangements of conventional rare earth-doped fiber circuits. In FIG. 1A, the circuit comprises a rare earth-doped fiber amplifier (e.g., an erbium-doped fiber amplifier) 10a and, preferably, an optical isolator 5 the output of which is connected to the output of the amplifier 10a. The amplifier 10a comprises an amplifying medium (or an erbium-doped fiber section) 1, a wavelength division multiplexer (WDM) 3 and a pump light source 2 using a laser diode. A pump light from the pump light source 2 is introduced into the doped fiber section 1 via the WDM 3. The pump light excites the erbium within the doped fiber section 1. A signal light is amplified through induced emission by the excited erbium. The optical isolator 5 may be disposed along output signal path and used to remove any counter-propagating signals from entering doped fiber section 1.

The pump light is introduced from the opposite side of the dope fiber section 1 with respect to the message signal input side of the amplifier 10a, whereas in an EDFA 10b in FIG. 1B, the pump light is introduced from the message signal input side of the amplifier 10b via WDM 4. A rare earth-doped fiber circuit in FIG. 1B preferably comprises an isolator 5 having its input connected to the output of the EDFA 10b and a band pass filter 6 for letting only the message signal pass preventing the pump light component from passing.

In case of an erbium-doped fiber amplifier, the wave length of the signal light is on the order of 1.55 $\mu$m and the wave length of the pump light is on the order of 0.98 $\mu$m or 1.48 $\mu$m.

In a doped fiber amplifier, entering of a signal light into the doped fiber section 1 keeps in an equilibrium the energy accumulated by the pump light and the energy used for amplification of the signal light through induced emission. However, if the signal light has not been entered for more than a certain period of time, then far more energy is accumulated as compared with the equilibrium state in the doped fiber section 1 because the accumulated energy is not used for amplification.

If a signal starts entering the doped fiber section 1 in such a no signal state, a large amount of accumulated energy is used for induced emission at a time, that is, a large power signal light is output from the doped fiber section 1 till the accumulated energy and the energy used for induced emission come to an equilibrium. The large power signal light, which has a pulse shape of a high energy, is called a light surge, and may cause a damage in optical elements constituting the optical amplifier and devices connected along the signal output line.

A technique for coping with the problem of optical surges is well known in the art in which optical surges are suppressed by lengthening the time taken for the signal light to rise sufficiently longer than the easing time constant of the doped fiber amplifier 1. However, the technique fails in complete suppression of optical surge pulses as well as causes a reserve signal source if any (as in a redundant system) to take much time for starting.

Japanese Patent unexamined publication No. hei5-63653 (1993) discloses a technique for controlling the output power through monitoring the output power. However, the technique is not effective in preventing optical surges to occur transitionally in case when a signal light enters a doped fiber section in the no signal state or in the case when the signal light has recovered after a temporary failure as may happen in a redundancy system.

SUMMARY OF THE INVENTION

It is therefore an object of the invention to provide a method and system disposed in or in the preceding stage of a rare earth-doped fiber amplifier for preventing any optical surges from occurring in such an amplifier.

According to an aspect of the invention, an optical amplifier medium, i.e., a rare earth-doped fiber section is always supplied with a background light which is different from a signal light and has such a wavelength as to cause induced emission in the doped fiber section in a rare earth-doped fiber amplifier so as not to be in a no signal state.

In one embodiment of an optical surge preventing system of the invention, a background light which is different from a signal light and has such a wavelength as to cause induced emission in the doped fiber section is generated, and introduced into the doped fiber section from either side thereof.

In another embodiment, a light spontaneously emitted from either side of a doped fiber section is branched and introduced into the doped fiber section from either side thereof.

According to another aspect of the invention, the output signal light from a signal light source or an input signal light to the rare earth-doped fiber amplifier is monitored and a dummy signal light is introduced into the doped fiber section from either side thereof.

In one embodiment according to this aspect of the invention, the dummy signal light is introduced into the doped fiber section from the signal input side thereof. For this reason, a surge preventing system of this type may be disposed in or near a signal light source.

In another embodiment according to the just mentioned aspect of the invention, the dummy signal light is introduced into the doped fiber section from the signal output side thereof. A surge preventing system of this type is inevitably incorporated in a device including a doped fiber amplifier.

BRIEF DESCRIPTION OF THE DRAWINGS

The objects and features of the present invention will become more apparent from the consideration of the following detailed description taken in conjunction with the accompanying drawing in which.

DESCRIPTION OF THE PREFERRED EMBODIMENTS

Referring to FIGS. 2 through 7, we discuss the techniques of preventing optical surges by coupling into a doped fiber section a background signal of such a wavelength as to cause induced emission in an optical amplifier medium, i.e., a doped fiber section.

Figure 2:
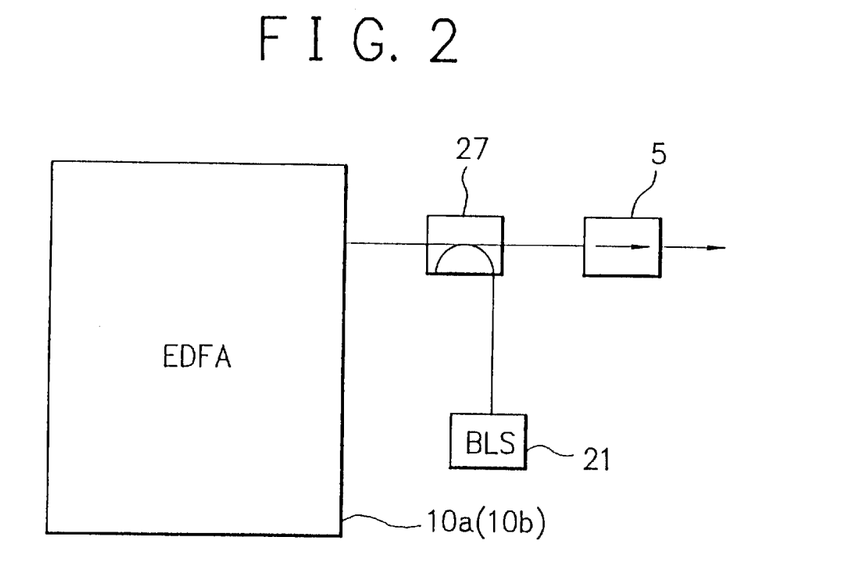
FIG. 2 is a block diagram showing a illustrative embodiment of a doped fiber amplifier circuit according to the principles of the invention in which a background signal is coupled into the amplified message signal output path of a doped fiber amplifier.

FIG. 2 is a block diagram showing a first illustrative embodiment of a doped fiber amplifier circuit according to the principles of the invention in which a background signal is coupled into the amplified message signal output path of a doped fiber amplifier. The doped fiber amplifier may be either of the doped fiber amplifiers 10a and 10b shown in FIGS. 1A and 1B. In this illustrative embodiment, the doped fiber amplifier is Erbium-doped, and accordingly referred to as an "EDFA 10a or 10b."

In FIG. 2, the doped fiber amplifier circuit comprises the EDFA 10a or 10b, a background signal light source (BLS) 21 for always outputting a background signal light with a wavelength $\lambda 2$, and an optical multiplexer 27 having two channels. One terminal of one of two channels is connected with the output path of the EDFA 10a or 10b and the other terminal of the channel is used as an output path for an amplified message signal. The amplified message signal input side terminal of the other channel is open, and the other terminal of the multiplexer 27 is coupled with the output of the BLS 21. Since the doped-fiber amplifier 10a and 10b have been described above, their description will be omitted.

In FIG. 2, the doped fiber amplifier circuit further comprises an optical isolator 5 inserted in the signal output path from the optical multiplexer 27 to prevent amplified signal lights reflected by any other device and optical fibers from returning.

The wavelength $\lambda 1$ of the message signal light is set for 1.55 micron, and the wavelength $\lambda 2$ of the background signal light is chosen from a range from 1.52 to 1.58 micron.

(Hereinafter, the message signal light and the background signal light are simply referred to as "the message signal" and "the background signal," respectively.)

The background signal wavelength $\lambda 2$ is preferably different from the message signal wavelength $\lambda 1$. However, in this embodiment, the wavelength $\lambda 2$ may be the same as the wavelength $\lambda 1$ because the propagation directions of the two signals are opposite to each other. Even if $\lambda 1 = \lambda 2$, the effect of optical interference, even if occurred, will be much smaller as compared with the message signal.

In operation, the background signal generated by the background signal source (BLS) 21 is always applied to the erbium doped-fiber section 1 via optical multiplexer 27. For this reason, if the erbium doped-fiber amplifier is 10a as shown in FIG. 1A, then the WDM 3 has to be transparent to a wavelength $\lambda 2$. Since the energy supplied by the pump light is used for induced emission caused by the background signal with a wavelength $\lambda 2$ even when the message signal does not exist in the doped fiber section 1, even a sudden input of the message signal after a certain period of absence of the message signal will not cause any optical surge.

The power of the background signal generated by BLS 21 is so chosen as to minimize the quantity of excited energy accumulated in the doped fiber section 1. The power of the pump light is set for a larger value as compared with a configuration without this optical surge preventing system, taking into account the consumption of excitation energy by induced emission caused by the background signal generated by BLS 21.

Figure 3:
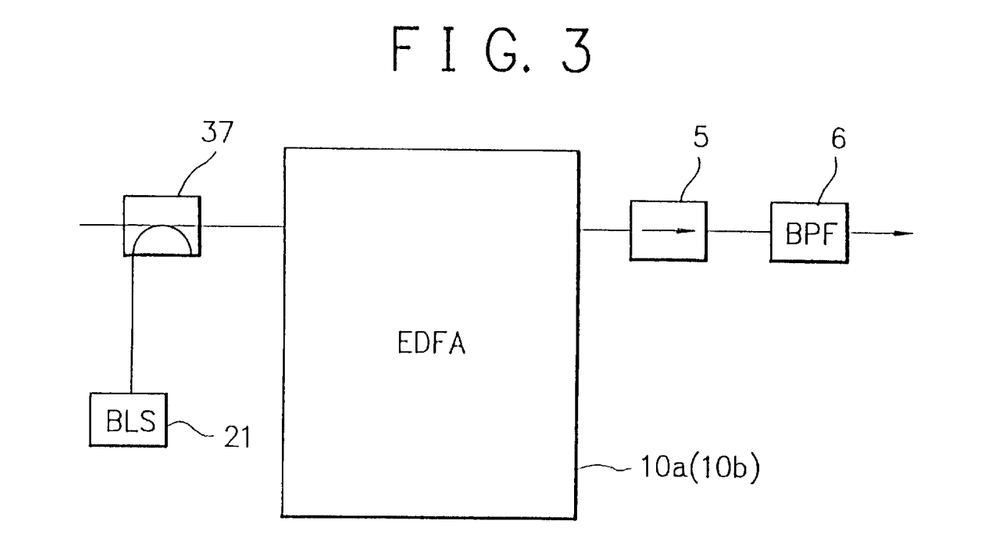
FIG. 3 is a block diagram showing an illustrative embodiment of a doped fiber amplifier circuit according to the principles of the invention in which a background signal is coupled into the message signal input path of a doped fiber amplifier.

FIG. 3 is a block diagram showing a second illustrative embodiment of a doped fiber amplifier circuit according to the principles of the invention in which a background signal is coupled into the message signal input path of a doped fiber amplifier. The doped fiber amplifier may be either of the doped fiber amplifiers 10a and 10b shown in FIGS. 1A and 1B. In this and other following illustrative embodiments, a doped fiber amplifier is Erbium-doped, and accordingly referred to as an "EDFA 10a or 10b."

In FIG. 3, the doped fiber amplifier circuit or EDFA circuit, again, comprises the EDFA 10a or 10b, a background signal light source (BLS) 21, and an optical multiplexer 37 having two channels. One terminal of one of two channels of the multiplexer 37 is coupled with a message signal input path and the other terminal of the channel is connected with the input of the EDFA 10a (10 b). The message signal input side terminal of the other channel is connected with the output of the BLS 21, and the other terminal of the multiplexer 37 is open.

In the embodiment, the message signal and the background signal are coupled into the same input path of the EDFA 10a (10B) from the same direction. For this, the wavelengths $\lambda 1$ and $\lambda 2$ are set for different values, and it is preferable that the EDFA circuit further comprises a band pass filter (BPF) 6 which only passes a light with a wavelength of $\lambda 1$ as well as the isolator 5.

It is noted that if the EDFA has an arrangement 10b as shown in FIG. 10b, the WDM 4 of the EDFA 10b must be transparent with respect to the wavelength λ1.

In the first and second embodiments, if it can be predicted that a no signal state will continue for a period of time longer than a certain period, the excitation energy which has been accumulated in the doped fiber section 1 may be used for induced emission by making the background signal source to output a background signal light after the detection of the absence of the message signal. However, if the period of the no signal state is on the order of ten msec, then a message signal may resume entering the doped fiber section 1 before the background signal generated from the BLS 21 after the detection of the stoppage of the message signal reaches the doped fiber section 1, causing a optical surge. In such a case, the BLS 21 is preferably made to always generate the background signal.

FIGS. 4 through 7 are block diagrams showing illustrative embodiments of doped fiber amplifier circuits according to the principles of the invention instead of the background signal light, a spontaneous emission light from either end of the doped fiber section 1 of the EDFA 10a is used instead of the light generated by the BLS 21.

Figure 4:
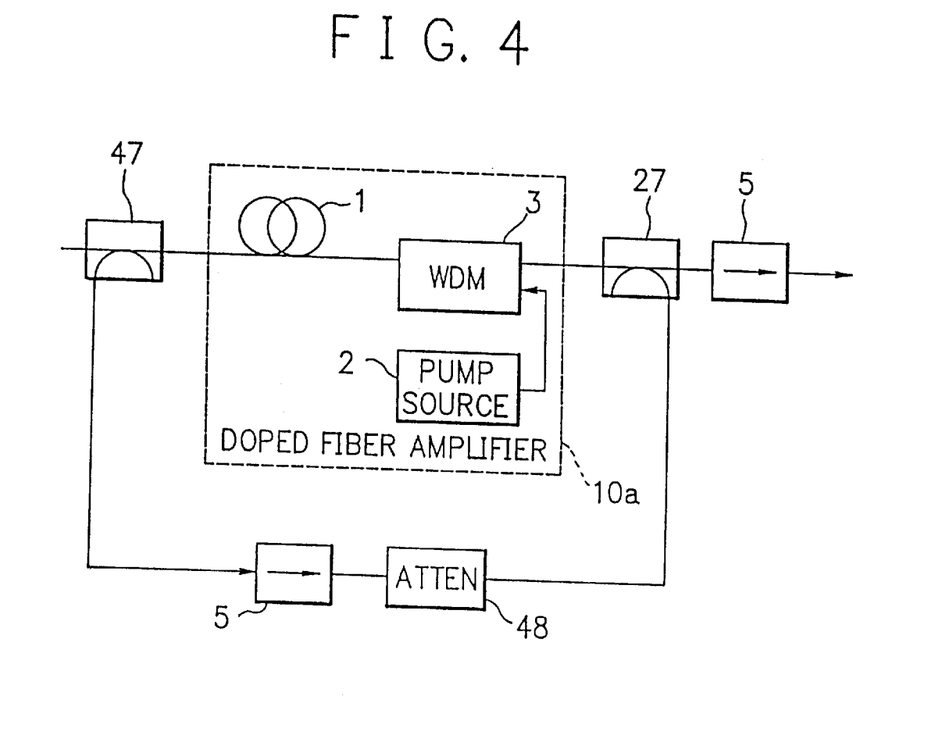
FIG. 4 shows a EDFA circuit in which a spontaneous emission light from the message signal input end of the doped fiber section 1 of the EDFA 10a is demultiplexed from the message signal input path of the EDFA 10a and coupled into the amplified message signal output path toward the doped fiber section 1.

FIG. 4 shows a EDFA circuit in which a spontaneous emission light from the message signal input end of the doped fiber section 1 of the EDFA 10a is demultiplexed from the message signal input path of the EDFA 10a and coupled into the amplified message signal output path toward the doped fiber section 1. The EDFA circuit comprises the EDFA 10a, a optical demultiplexer 47 for passing a message signal to the input of the EDFA 10a and branching a spontaneous emission light on the signal input path of the EDFA 10a into a background signal path, an isolator 5 disposed in the background signal path, an optical attenuator 48 having its input terminal connected with the isolator 5 output and an optical multiplexer 27 for passing the amplified message signal to the next stage and coupling the attenuated background signal into the output path of the EDFA 10a toward the doped fiber section 1.

The spontaneous emission light has wavelengths ranging from 1.52 through 1.58 micron. Since spontaneous emission light is emitted from both ends of the doped fiber section 1, the spontaneous emission light may be derived from the message signal output path of the EDFA 10a. In this case, the EDFA circuit preferably comprises a band cut filter or a WDM in order to prevent a message signal component concurrently branched with the spontaneous emission light from returning to the doped fiber section 1.

For the optical demultiplexer 47 and the optical multiplexer 27. WDMs which are capable of effectively multiplexing and demultiplexing the message signal and the spontaneous emission light may be used. The positions of the elements 5 and 48 may be reversed.

Since the return path along which the spontaneous emission light is transmitted from the branching point to the coupling point constitutes a loop together with the EDFA internal path, the sum of the losses in the return path is set for a larger value as compared with the gain of the doped fiber section 1 so as not to cause a loop oscillation. This is achieved by optimizing the losses of the demultiplexer 47, the multiplexer 27, and the attenuator 48.

Figure 5:
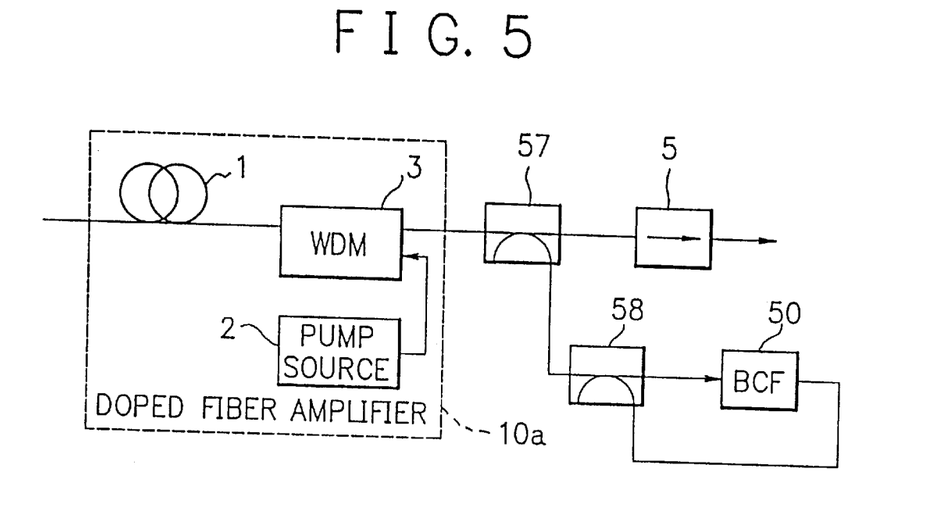
FIGS. 5 through 7 are block diagrams showing exemplary optical surge preventing systems embodying the principles of the present invention by introducing a light spontaneously emitted from a message signal output end of a doped fiber section in a EDFA into the doped fiber section from a message signal output path of the EDFA.
Figure 6:
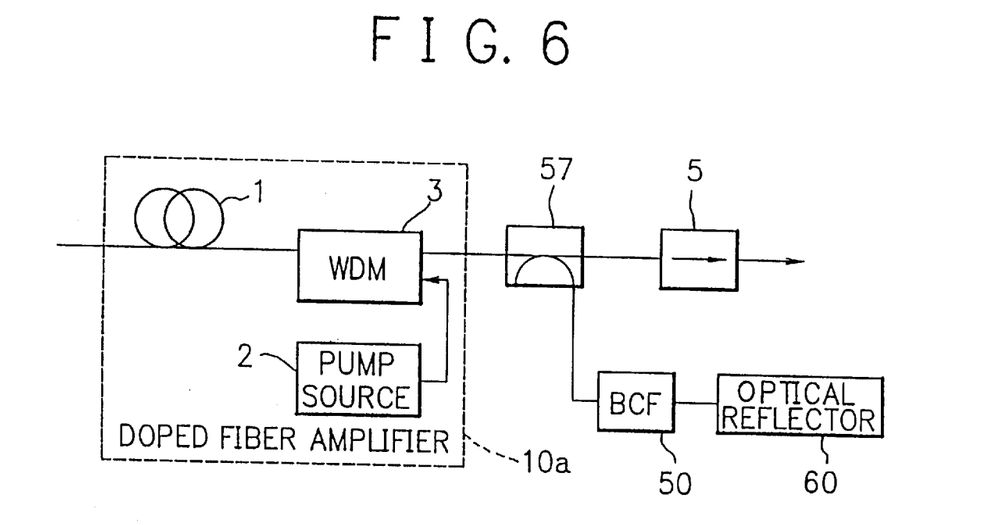
Figure 7:
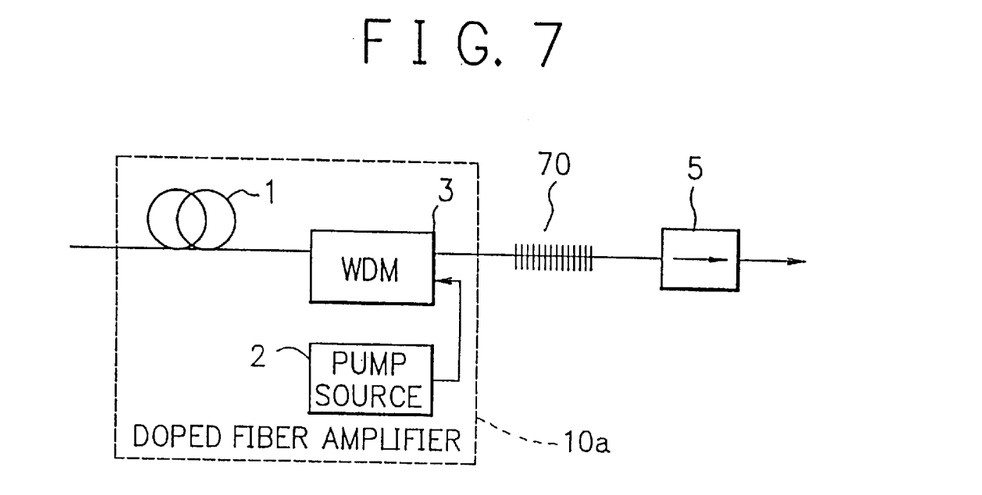

In EDFA circuits of FIGS. 5 through 7, the spontaneous emitted light from the amplified signal output end of the doped fiber section 1 is once branched and coupled into the amplified signal output path of the EDFA 10a toward the doped fiber section 1.

In FIG. 5, the EDFA circuit comprises optical multiplexer/demultiplexers 57 and 58 and a band cut filter (BCF) 50. The element 57 passes parts of the amplified message signal and the spontaneous emission light, concurrently branches the rests of them from the EDFA output path to the element 58, and concurrently couples only a spontaneous emission light component from the BCF 50 into the EDFA output path toward the doped fiber section 1. The element 58 passes the branched output of the element 57 to the band cut filter (BCF) 50 through one of two channels and concurrently couples the output of the BCF 50 into the branch output path of the element 57.

In operation, a spontaneous emission light component and a message signal component branched by the element 57 is passed to the BCF 50 via element 58. Only the spontaneous emission light component is coupled into the signal output path of the EDFA 10a via elements 58 and 57.

The optical multiplexer/demultiplexer 58 may be an optical circulator or an ordinary coupler. Also, a WDM may be used for the multiplexer/demultiplexer 57. Since the amplified message signal can be attenuated by the element 57 in this case, the BCF 50 can be removed.

In FIG. 6, a combination of the elements 58 and 50 in FIG. 5 has been replaced by a combination of a BCF 50 and an optical reflector 60. Though the amplified message signal and the spontaneous emission light are branched by the element 57, only a spontaneous emission light component is returned to the EDFA output path toward the doped fiber section 1 through the BCF 50 and the optical reflector 60.

In FIG. 7, the optical surge preventing portion, that is, the elements 57, 58 and 50 FIG. 5, and the elements 57. 50 and 60 in FIG. 6 has been reduced to a single element or an optical fiber grating 70 which serves as a wavelength-selective passing/reflecting means. The optical fiber grating 70 is so arranged as to pass the wavelength of the message signal and reflect the spontaneous emission light of the other wavelengths.

Though in the embodiments of FIGS. 5 through 7, the optical surge preventing portion is disposed in the EDFA output path, the optical surge preventing portion may be disposed in the EDFA input path.

Also, in the embodiments of FIGS. 5 through 7, the EDFA 10a may be replaced by EDFA 10b.

The embodiments of FIGS. 5 through 7 each are preferably provided with an optical isolator 5 in the message signal output path and, if necessary, an additional optical isolator (not shown) in the EDFA input path to prevent the amplified message signal having been reflected by other devices and optical fibers from returning.

There are neodymium (Nd), praseodymium (Pr), etc. as well as erbium (Er) as dopant rare earth elements with which an optical fiber constituting the doped fiber section 1 can be doped. The wavelength of the pump light for an erbium doped fiber may be 0.98 or 0.8 micron other than 1.48 micron. In case of an Nd-doped fiber, the pump signal may be 0.8 or 0.87 micron in wavelength and, depending on the arrangement of the doped fiber amplifier circuit, different or the same values may be chosen to be the message and the background signal wavelengths λ1 and λ2 from a 1.06 micron band and a 1.32 micron band, respectively. Also, in case of an Pr-doped fiber, the pump signal is 1.017 micron in wavelength and, depending on the arrangement of the doped fiber amplifier circuit, different or the same values may be chosen to be the message and the background signal wavelengths λ1 and λ2 from a 1.3 micron band (a range from 1.27 to 1.35 micron).

For the optical couplers 27, 37 and 47 in FIGS. 2 through 4, there may be used a WDM in which a half mirror is used, a fiber-fused coupler, or a directional coupler such as an optical circulator. The optical filters 6 and 50 may be of a fiber-fused type or of a diffraction grating type. The optical isolators 5 may be a combination of a YIG faraday rotator and a polarizer.

An optical fiber grating is a diffraction grating or an optical fiber the core of which has periodically changing index of refraction, and can serve as a filter for reflecting light with a specific wavelength range. The optical fiber grating is formed by irradiating ultraviolet rays to a core doped with germanium oxide by means of the holographic interferometer.

Well known laser diodes such as a distributed feedback semiconductor laser may be used for the background signal light source 21 and pump source 2.

Referring now to FIGS. 8 through 12, we discuss the techniques of preventing optical surges by introducing a dummy signal light into a doped fiber section only if the level of a message signal light on the message signal input path to an doped fiber amplifier is lower than a predetermined value. The wavelength of the dummy signal light is so set as to cause induced emission in a doped fiber section.

Figure 8:
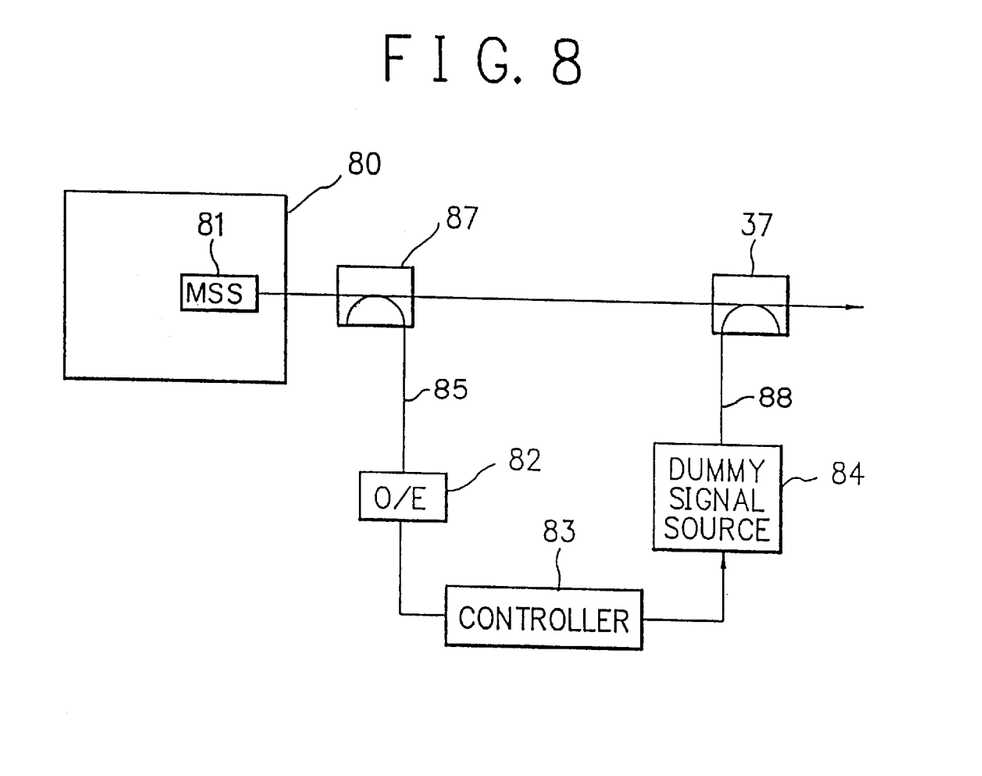
FIG. 8 is a block diagram showing an exemplary optical serge preventing circuit embodying the principles of the invention by introducing a dummy signal light into a message signal input path of an EDFA if the level of a message signal light supplied from a signal light source to the EDFA is less than a predetermined value.

FIG. 8 is a block diagram showing an exemplary optical surge preventing system embodying the principles of the invention by introducing a dummy signal light into a message signal input path of an EDFA if the level of the message signal light on the message signal input path to the EDFA is lower than a predetermined value. In FIG. 8, the optical surge preventing system comprises an optical demultiplexer 87 for branching into an optical path 85 a message signal on a message signal transmission path extending from a message signal source (MSS) 81 in a optical transmitter 80 to an EDFA (not shown), an opto-electric converter (0/E) 82 for converting a branched message signal on the optical path 85 into an electric signal, a controller 83 for outputting a control signal only when the electric signal level is lower than the predetermined value, a dummy signal source 84 for generating a dummy signal in response to the control signal from the controller 83, and an optical multiplexer 37 for coupling the dummy signal into the message signal transmission path 88 toward the EDFA.

For the optical demultiplexer 87 and multiplexer 37, there are used, e.g., single mode optical fiber couplers with a branch ratio of 10 dB to 3 dB. The opto-electric converter 82 is, e.g., an InGaAs photo-diode. The dummy signal source comprises, e.g., a distributed feedback semiconductor laser which oscillates at a wavelength of 1.552 µm for example. The wavelength of the MSS 81 is, e.g., 1.554 µm, resulting in a wavelength difference with the dummy signal source 84 of 2 nm. An arrangement is so made that the message signal level from the MSS 81 is +10 dB and the level of an output signal of the optical mautiplexer 25 is +5 dB.

Figure 9:
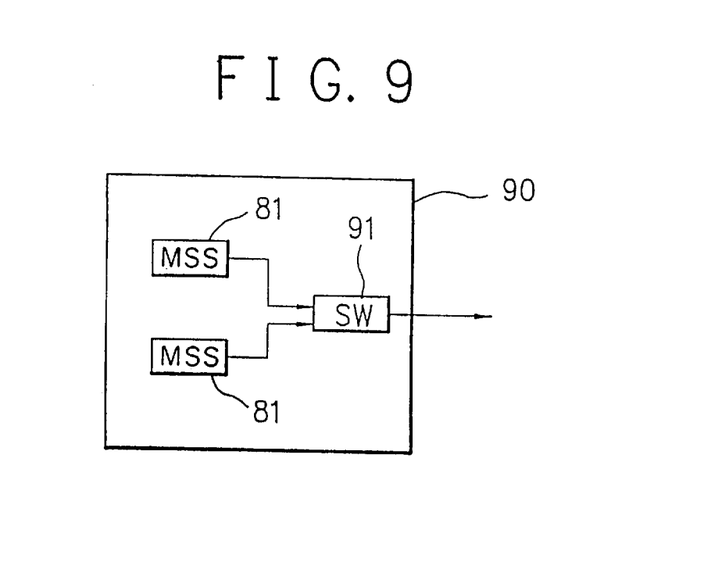
FIG. 9 is a diagram showing an exemplary signal light source in a redundant configuration.

FIG. 9 is a diagram showing an exemplary signal light source system in a redundant configuration to which the inventive optical surge preventing system can be effectively applied. In FIG. 9, the signal light source system 90 comprises two message signal sources (MSSs) 81 and a switch 91 having two input connected to respective MSS 81 and having its output coupled with the message signal transmission path 88. The switch 91 usually outputs the message signal of one of the two MSSs 81, and changes its output to the message signal of the other MSS 81.

Figure 10:
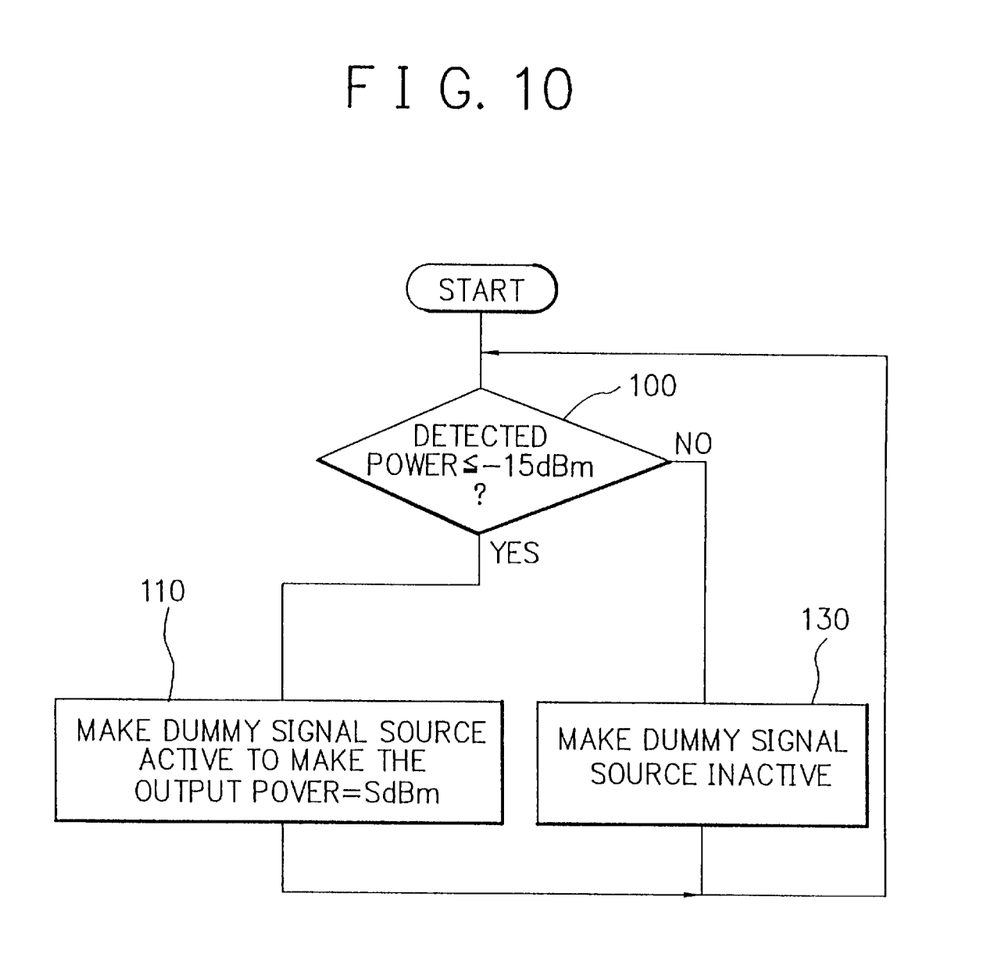
FIG. 10 is a flow chart showing operation of a controller of the optical surge preventing system of FIG. 8.

FIG. 10 is a flow chart showing operation of a controller of the optical surge preventing system shown in FIG. 8. In FIG. 10, the controller 83 tests the level of the signal received from the O/E converter 82 to see if the received signal level is equal to or less than a predetermined value, say, −15 dB in step 100. If so, the controller 83 proceeds to step 110 to control the dummy signal source 84 to generate a dummy signal so as to make the output level of the multiplexer 37 at +5 dB, and returns to step 100. Otherwise, the controller 83 goes to step 130 to make the dummy signal source 84 inactive, and returns to step 100. The controller 83 repeats the above described procedures.

The predetermined value may be set for any other value depending on the arrangement of the optical transmission system in which the optical surge preventing system is incorporated.

We measured the magnitude of optical surge pulses using an optical transmission system comprising an optical transmitter as shown in FIG. 8 and five optical amplifier repeaters. The input and output levels of each repeater was −11 dBm and +5 dBm, respectively. The distance between repeaters was 80 km, and the optical fiber loss was 0.2 dB/km. Under these conditions, the surge pulse was less than −20 dBm for a message signal level=+5 dBm.

On the other hand, the measurement of optical surge pulse was made under the same condition in the same optical transmission with no dummy signal inserted. As a result, the optical surge pulse power of +28 dBm (631 mW) was observed at the time of starting of the optical transmitter 80.

Figure 11:
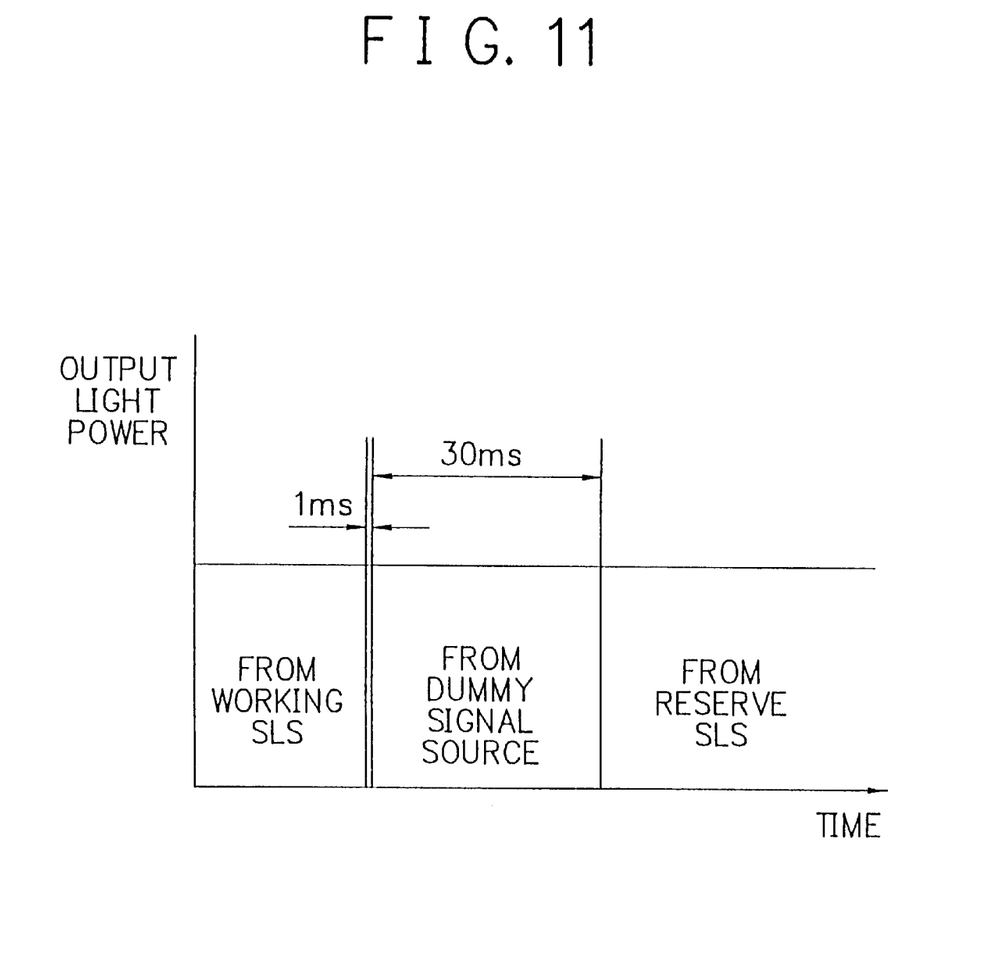
FIG. 11 is a diagram showing the transmitted signal power on the message signal transmission path at the switching between the message signal sources in FIG. 9.

FIG. 11 is a diagram showing the transmitted signal power on the message signal transmission path at the switching between the MSSs 81 in FIG. 9. Since the MSS system 90 takes a response time of about 30 ms to change the MSSs 81, a no signal state lasts for the response time. However, the dummy signal source 84 generates a dummy signal for the response time and the generated dummy signal is coupled into the message signal transmission path 88, yielding a substantially off-less transmission light on the message signal transmission path 88 as shown in FIG. 11. In the optical serge preventing system shown in FIG. 8, the response time from the O/E converter detecting the absence of the message signal to generation by the dummy signal source 84 was less than 1 ms, that is, the period for which the no signal state could not be compensated was less than 1 ms. The response time of 1 ms is sufficiently smaller than a relaxation time constant of an Er-doped fiber amplifier (EDFA) or approximately 10 through 20 ms. The experiments has proved that the response time causes no optical surge pulse.

Also, the time period that it takes to control the dummy signal source 84 to stop its generation after the O/E converter has detected the absence of the message signal is very short. For this reason, the effect of overlapping between the dummy signal and a message signal transmitted from a reserve MSS 81 is negligible, which has been proved through the experiments. It is noted that if the dummy signal is inserted at an 0/E converter output power exceeding about −3 through −5 dBm, then the response time may be longer than the relaxation time constant of EDFAs.

It is also noted that it is preferable to provide an optical surge preventing system according to this illustrative embodiment of the invention in a position near a message signal source in a broadcast station.

Figure 12:
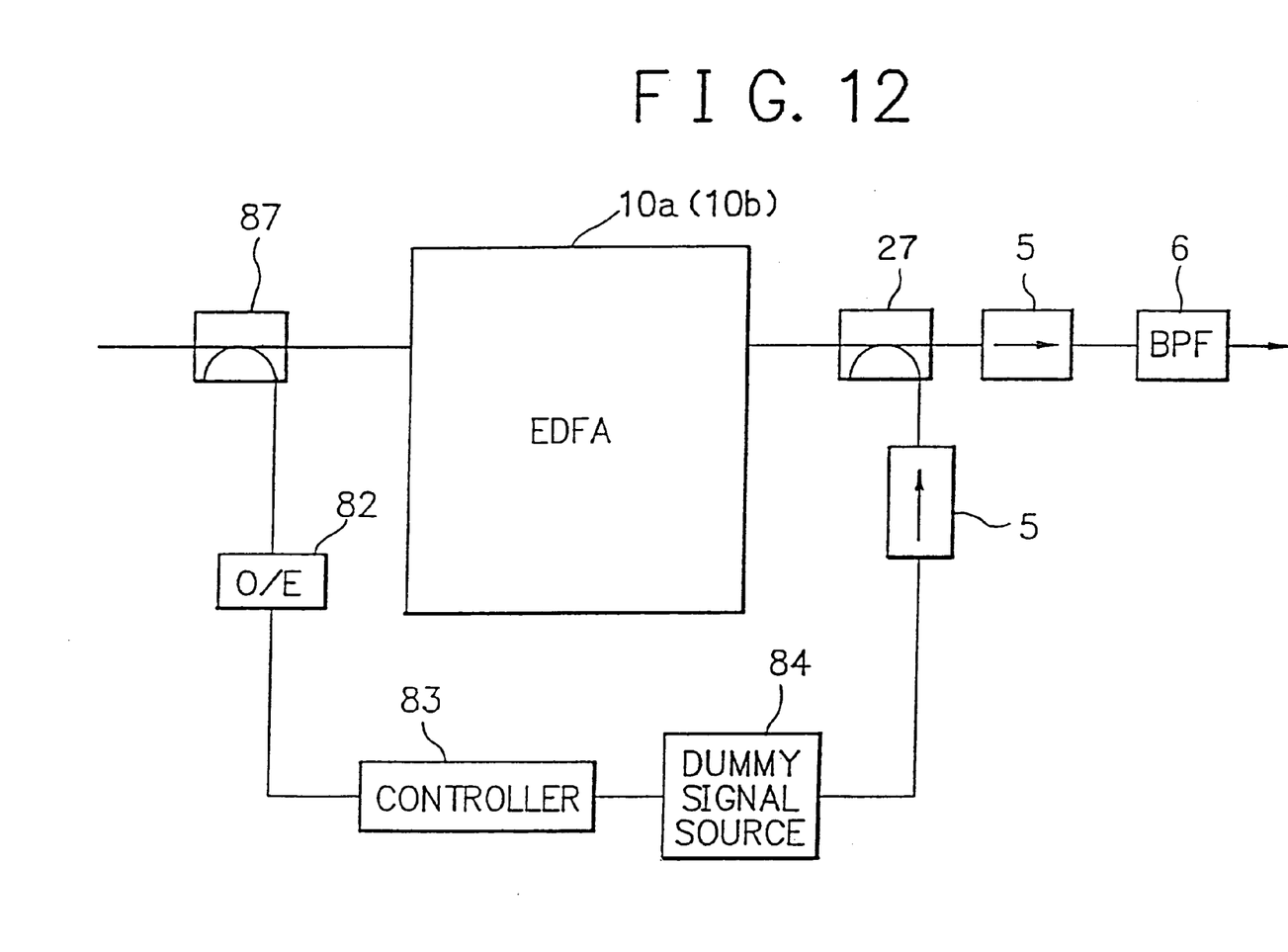
FIG. 12 is a block diagram showing an EDFA circuit incorporating a optical surge preventing system embodying the principles of the invention by introducing a dummy signal light into a doped fiber section from the message signal output path of the EDFA if the level of a message signal supplied from a signal light source to the EDFA is less than a predetermined value.

FIG. 12 is a block diagram showing an EDFA circuit incorporating a optical surge preventing system embodying the principles of the invention by introducing a dummy signal light into a doped fiber section from the message signal output path of the EDFA toward the EDFA if the level of a message signal supplied on the message signal input path to the EDFA is lower than a predetermined value.

The optical surge preventing system in FIG. 12 is identical to that of FIG. 8 excepting that the optical multiplexer 37 has been moved to the EDFA output path as multiplexer 27 and an optical isolator 5 has been added between the dummy signal source 84 and the multiplexer 27. The EDFA may be either of the EDFA 10a and 10b in FIGS. 1A and 1B. The isolator 5 prevents the dummy signal and the amplified message signal from entering the optical surge preventing system.

In this embodiment, the message signal source (not shown) comprises, e.g., a distributed feedback semiconductor with an oscillation wavelength of 1.558 μm, and the O/E converter 82 is, e.g., an InGaAs photo-diode. The dummy signal source comprises, e.g., a distributed feedback semiconductor which oscillates within a wavelength difference of 2 nm with respect to the message signal wavelength.

Operation of the controller 83 is identical to that of FIG. 8, and its description will be omitted.

The experiments made under the condition that the input and output levels of the EDFA 10b was −11 dBm and +5 dBm, respectively, showed that the surge pulse was less than −20 dBm for a message signal level=+5 dBm.

In the optical surge preventing system shown in FIG. 12, the response time from the O/E converter detecting the absence of the message signal to generation by the dummy signal source 84 is less than 1 ms, that is, the period for which the no signal state can not be compensated is less than 1 ms. The response time of 1 ms is sufficiently smaller than a relaxation time constant of an Er-doped fiber amplifier (EDFA) or approximately 10 through 20 ms. Therefore, the response time causes no optical surge pulse.

In this embodiment, it is preferable that the message and dummy signal wavelengths are identical. If the two wavelength are different from each other, then it reduces the effect of suppressing the occurrence of optical surge pulses. However, if the wavelength of the dummy signal is within a homogeneous spreading band of the doped fiber amplifier, the doped fiber amplifier is saturated by the dummy signal, which causes substantially no optical surge pulse. The homogeneous spreading band of an EDFA is as wide as about 20 nm. If the dummy signal wavelength is in this range, the prevention of optical surge pulses can be effectively achieved. It is also noted that the power levels of the message and dummy signals are preferably identical.

The light sources used in the invention may be any other semiconductor lasers of different material with different arrangement, gas lasers, or light emitting diodes. The optical multiplexers and demultiplexers may be any other elements as long as they has the same functions.

While the present invention has been described with reference to the particular illustrative embodiments, it is not to be restricted by those embodiments but only the appended claims. It is to be appreciated that those skilled in the art can change or modify the embodiments without departing from the scope and sprit of the present invention.

What is claimed is:

1. a method for preventing optical surge pulses in an optical transmission system including an optical amplifier comprising an optical amplifier medium for amplifying a message signal light, the method comprising the steps of:

providing an optical amplifier medium;

providing a pump source for generating a pump light;

introducing said pump light into said optical amplifier medium;

preparing a background signal light which is always available and has such a wavelength as to cause induced emission in said optical amplifier medium; and always introducing said background signal light into said optical amplifier medium regardless of the presence of said message signal light.

2. A method as defined in claim 1, wherein said preparing step comprises the step of:

generating said background signal light.

3. A method as defined in claim 1, wherein said preparing step comprises the step of:

intercepting spontaneous emission light emitted from one end of said optical amplifier medium and outputting said intercepted spontaneous emission light as said background signal light.

4. A method as defined in claim 1, wherein said introducing step comprises the step of:

introducing said background signal light into said optical amplifier medium in the same direction as the message signal light propagation direction.

5. A method as defined in claim 4, further comprising the step of:

setting the wavelength of said background signal light for a wavelength different from that of said message signal light.

6. A method as defined in claim 5, further comprising the step of:

passing only a message signal component of an output signal from said optical amplifier.

7. A system for preventing any optical surge pulses in a optical transmission system including a doped fiber amplifier comprising an optical amplifier medium for amplifying a message signal light, the system comprising:

means for intercepting spontaneous emission light emitted from a message signal output path of said doped fiber amplifier and returning said intercepted spontaneous emission light into said message signal output path toward said optical amplifier medium opposite to the direction of propagation of the message signal output.

8. A system as defined in claim 7, wherein said means comprises:

an optical multiplexer/demultiplexer (MUD) for branching a part of signals on said message signal output path into an optical path while passing the rest of said signals on said message signal output path; and means connected to said optical path for receiving said part of said signals and returning a message signal removed version of said part of said signals to said MUD through said optical path.

9. A system as defined in claim 8, wherein said receiving and returning means comprises:

means for determining a propagation course of said part of said signals; and means for blocking only a selected wavelength component of said part of said signals.

10. A system as defined in claim 7, wherein said means comprises:

means for passing only a selected component of signals on said message signal output path while reflecting the other components of said signals.

11. A system as defined in claim 10, wherein said passing and reflecting means is an optical fiber grating.

12. A system as defined in claim 7, wherein said introducing means comprises:

means for introducing said background signal light into said optical amplifier medium in the same direction as the message signal light propagation direction.

13. A system as defined in claim 12, wherein the wavelength of said background signal light is different from that of said message signal light.

14. A system as defined in claim 13, further comprising:

means for passing only a message signal component of an output signal from said optical amplifier.

15. An optical amplifier having a function of preventing optical surge pulses which otherwise occur at a time of a signal input thereto in a no-signal state thereof, the optical amplifier comprising:

an optical amplifier medium;

a pump source for generating a pump light;

means for introducing said pump light into said optical amplifier medium;

means for preparing a background signal light which is always available and has such a wavelength as to cause induced emission in said optical amplifier medium; and means always operative in an operation period of said optical transmission system for introducing said background signal light into said optical amplifier medium regardless of the presence of said signal input.

16. An optical amplifier as defined in claim 15, further comprising:

means disposed as a last stage of the optical amplifier for preventing any returning light from entering the optical amplifier.

17. An optical amplifier as defined in claim 15, wherein said preparing means comprises:

means for generating said background signal light.

18. An optical amplifier as defined in claim 15, wherein said preparing means comprises:

means for intercepting spontaneous emission light emitted from either end of said optical amplifier medium and outputting said intercepted spontaneous emission light as said background signal light.

19. An optical amplifier as defined in claim 18, wherein said means for introducing said background signal light comprises:

means for introducing said background signal light into said optical amplifier medium from a message signal output end thereof.

20. An optical amplifier as defined in claim 19, wherein said means for introducing said background signal light comprises:

means for intercepting said spontaneous emission light emitted from a message signal input end of said optical amplifier medium;

means for preventing an amplified message signal from propagating along a path including said preparing means and said means for introducing said background signal light;

means for attenuating said intercepted spontaneous emission light.

21. An optical amplifier having a function of preventing optical surge pulses which occur at a time of a signal input thereto in a no-signal state thereof, the optical amplifier comprising:

an optical amplifier medium;

a pump source for generating a pump light;

means for introducing said pump light into said optical amplifier medium; and means for intercepting spontaneous emission light on a message signal output path connected with an output end of said optical amplifier medium and returning said intercepted spontaneous emission light toward said optical amplifier medium via said message signal output path.

22. An optical amplifier as defined in claim 21, wherein said intercepting and returning means comprises:

an optical multiplexer/demultiplexer (MUD) for branching a part of signals on said message signal output path into an optical path while passing the rest of said signals on said message signal output path; and means connected to said optical path for receiving said part of said signals and returning a message signal removed version of said part of said signals to said MUD through said optical path.

23. An optical amplifier as defined in claim 22, wherein said receiving and returning means comprises:

means for determining a propagation course of said part of said signals; and means for blocking only a selected wavelength component of said part of said signals.

24. An optical amplifier as defined in claim 21, wherein said intercepting and returning means comprises:

means for passing only a selected component of signals on said message signal output path while reflecting the other components of said signals.

25. An optical amplifier as defined in claim 24, wherein said passing and reflecting means is an optical fiber grating.

26. An optical amplifier as defined in claim 21, wherein said means for introducing said background signal light comprises:

means for introducing said background signal light into said optical amplifier medium in the same direction as the message signal light propagation direction.

27. An optical amplifier as defined in claim 26, wherein the wavelength of said background signal light is different from that of said message signal light.

28. An optical amplifier as defined in claim 27, further comprising:

means for passing only a message signal component of an output signal from said optical amplifier.

29. An optical amplifier as defined in claim 21, wherein said optical amplifier medium comprises a rare earth-doped optical fiber.

30. An optical amplifier as defined in claim 28, wherein said optical amplifier medium comprises a rare earth-doped optical fiber.

31. A method for preventing any optical surge pulses in an optical transmission system comprising a message signal light source, an optical transmission path with one end coupled with the message signal light source output and an optical fiber amplifier comprising an optical amplifier medium for amplifying a message signal light on said optical transmission path, the method comprising the steps of:

extracting a portion of said message signal light;

converting said extracted portion of said message signal light to an electrical signal;

determining the wavelength of a dummy signal light that when introduced into said optical amplifying medium causes induced emission in said optical amplifying medium;

generating the dummy signal light; and directly introducing said dummy signal light into said optical amplifier medium only if the power of said message signal light on said optical transmission path is at most a predetermined value.

32. A method as defined in claim 31, wherein said introducing step comprising the step of:

introducing said dummy signal light into said optical amplifier medium within a period shorter than a relaxation time constant of said optical fiber amplifier after the power of said message signal light on said optical transmission path has become at most a predetermined value.

33. A method as defined in claim 31, further comprising the step of:

setting the wavelength of said dummy signal light for a value in a homogeneous spreading band.

34. A method as defined in claim 31, further comprising the step of:

setting the level of said dummy signal light for the same level as that of said message signal light.

35. A system for preventing any optical surge pulses in an optical transmission system comprising a message signal light source, an optical transmission path with one end coupled with the message signal light source output and an optical fiber amplifier comprising an optical amplifier medium for amplifying a message signal light on said optical transmission path, the system comprising:

means for extracting a portion of said message signal light;

means for converting said extracted portion of said message signal light to an electrical signal;

determining means for determining the wavelength of a dummy signal light that when introduced into said optical amplifying medium causes induced emission in said optical amplifying medium;

means for generating the dummy signal light; and means for directly introducing said dummy signal light into said optical amplifier medium only if the power of said message signal light on said optical transmission path is at most a predetermined value.

36. A system as defined in claim 35, wherein said means for introducing said dummy signal light comprising:

means for making a decision on whether said power of said message signal light on said optical transmission path is not more than said predetermined value; and means response to said decision for introducing said dummy signal light into said optical amplifier medium.

37. A system as defined in claim 36, wherein said means for making a decision comprises:

means for converting said message signal light into a electrical signal; and means for making said decision on the bases of a comparison between the power of said electrical signal and said predetermined value.

38. A system as defined in claim 35, wherein said means for introducing said dummy signal light comprising:

means for introducing said dummy signal light into said optical amplifier medium within a period shorter than a relaxation time constant of said optical fiber amplifier after the power of said message signal light on said optical transmission path has become at most said predetermined value.

39. A system as defined in claim 35, wherein the wavelength of said dummy signal light is in a homogeneous spreading band.

40. A system as defined in claim 35, wherein:

the level of said dummy signal light is the same level as that of said message signal light.

41. A system as defined in claim 35, wherein said means for introducing said dummy signal light comprises:

means for introducing said dummy signal light into said optical amplifier medium from the message signal propagation direction.

42. A system as defined in claim 41, wherein the system is disposed between said message signal light source and said optical fiber amplifier.

43. An optical transmitter incorporating said system as defined in claim 41, wherein:

the optical transmitter includes said message signal light source; and said system for preventing any optical surge pulses is disposed in a down stream of said optical transmission path.

44. An optical transmitter as defined in claim 43, wherein said message signal light source comprises:

a first and second message signal light sources; and means having two input ends thereof coupled to the outputs of said first and second signal light sources for selecting as an output of the optical transmitter one of said outputs of said first and second signal light sources.

45. A system as defined in claim 35, wherein said means for introducing said dummy signal light comprises:

means for introducing said dummy signal light into said optical amplifier medium from the direction opposite to the message signal propagation direction.

46. A system as defined in claim 35, wherein said optical fiber amplifier has the output thereof coupled with a downstream optical transmission path, and wherein said means for introducing said dummy signal light comprising:

means for making a decision on whether said power of said message signal light on said optical transmission path is not more than said predetermined value; and means response to said decision for generating said dummy signal light;

means inserted into said downstream optical transmission path for coupling said dummy signal light into said optical amplifier medium from the direction opposite to the message signal propagation direction while passing an amplified message signal from said optical fiber amplifier.

47. A system as defined in claim 46, further comprising:

means disposed between said generating means and said coupling means for preventing any signals coming from said coupling means from entering said generating means.

48. A system as defined in claim 47, further comprising:

means disposed in said downstream optical transmission path and in the next stage of said preventing means for passing only said amplified message signal light.

49. A system as defined in claim 46, wherein said means for making a decision comprises:

means for converting said message signal light into a electrical signal; and means for making said decision on the bases of a comparison between the power of said electrical signal and said predetermined value.

50. An optical amplifier having a function of preventing any surge pulses which would otherwise occur at a time of a signal input thereto in a no-signal state thereof, the optical amplifier comprising:

an optical amplifier medium having an input and an output end thereof coupled with a down stream and an upstream optical transmission path, respectively;

a pump source for generating a pump light;

means for introducing said pump light into said optical amplifier medium;

means for extracting a portion of said signal input;

means for converting said extracted portion of said signal input to an electrical signal;

determining means for determining the wavelength of a dummy signal light that when introduced into said optical amplifying medium causes induced emission is said optical amplifying medium;

means for generating the dummy signal light; and means for directly introducing said dummy signal light into said optical amplifier medium only if the power of said input signal on said upstream optical transmission path is not more than a predetermined value.

51. An optical amplifier as defined in claim 50, wherein said means for introducing said dummy signal light comprises:

means for making a decision on whether said power of said message signal light on said upstream optical transmission path is not more than said predetermined value; and means response to said decision for generating said dummy signal light;

means inserted into said downstream optical transmission path for coupling said dummy signal light into said optical amplifier medium from the direction opposite to the message signal propagation direction while passing an amplified message signal from said optical amplifier medium.

52. A system as defined in claim 51, further comprising:

means disposed between said generating means and said coupling means for preventing any signals coming from said coupling means from entering said generating means.

53. A system as defined in claim 52, further comprising:

means disposed in said downstream optical transmission path and in the next stage of said preventing means for passing only said amplified message signal light.

54. A system as defined in claim 51, wherein said means for making a decision comprises:

means for converting said message signal light into a electrical signal; and means for making said decision on the bases of a comparison between the power of said electrical signal and said predetermined value.

* * * * *

UNITED STATES PATENT AND TRADEMARK OFFICE
CERTIFICATE OF CORRECTION

PATENT NO. : 6,064,514
DATED : May 16, 2000
INVENTOR(S) : Yasuhri Aoki, et al.

It is certified that error appears in the above-identified patent and that said Letters Patent is hereby corrected as shown below:

On The Title Page, [57] ABSTRACT: "over" should read --overly--

Column 5, Line 51: "27." should read --27,--

Column 6, Line 32: "57." should read --57,--

Column 10, line 66, Claim 12: "Claim 7" should read --Claim 1--

Signed and Sealed this

Fifteenth Day of May, 2001

Attest:

NICHOLAS P. GODICI

Attesting Officer     Acting Director of the United States Patent and Trademark Office